United States Patent
Acton et al.

(10) Patent No.: US 6,957,355 B2
(45) Date of Patent: Oct. 18, 2005

(54) METHOD AND SYSTEM FOR DYNAMICALLY ADJUSTING STORAGE SYSTEM WRITE CACHE BASED ON THE BACKUP BATTERY LEVEL

(75) Inventors: John D. Acton, Danville, CA (US); Mark Farabaugh, Sunnyvale, CA (US); William M. Hamilton, III, Livermore, CA (US); Joel P. Miller, Vacaville, CA (US); Jonathan Broome, Long Beach, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 480 days.

(21) Appl. No.: 10/247,696

(22) Filed: Sep. 18, 2002

(65) Prior Publication Data

US 2004/0054851 A1   Mar. 18, 2004

(51) Int. Cl.⁷ ............................................. G06F 10/14
(52) U.S. Cl. ...................... 713/340; 713/320; 713/323; 713/324; 710/52; 710/57; 714/5
(58) Field of Search .............................. 713/320, 323, 713/324, 340; 710/52, 57; 714/6

(56) References Cited

U.S. PATENT DOCUMENTS

| | | | |
|---|---|---|---|
| 5,448,719 A | 9/1995 | Schultz et al. | 395/182.03 |
| 5,458,991 A | 10/1995 | Severinsky | 429/61 |
| 5,905,994 A | 5/1999 | Hori | 711/113 |
| 5,920,728 A * | 7/1999 | Hallowell et al. | 713/340 |
| 6,035,347 A * | 3/2000 | Beardsley et al. | 710/52 |
| 6,205,521 B1 * | 3/2001 | Schumann | 711/144 |
| 6,236,226 B1 | 5/2001 | Hagiwara | 324/771 |
| 6,268,665 B1 | 7/2001 | Bobry | 307/66 |
| 6,643,786 B1 * | 11/2003 | Kawakami | 713/340 |
| 6,725,397 B1 * | 4/2004 | Emberty et al. | 714/24 |
| 6,792,551 B2 * | 9/2004 | Dai | 713/320 |
| 6,829,724 B2 * | 12/2004 | Farabaugh et al. | 714/14 |
| 6,839,287 B2 * | 1/2005 | Brucklmayr et al. | 365/189.05 |

* cited by examiner

*Primary Examiner*—A. Elamin
(74) *Attorney, Agent, or Firm*—Kudirka & Jobse, LLP (57) ABSTRACT

A method and system for managing cache levels based on battery backup level are described. In one embodiment, the method comprises measuring the level of charge stored in an exhaustible power source. The method further comprises monitoring the level of charge stored in the exhaustible power source. The method further comprises adjusting the storage level of the cache in response to a detected change in the level of charge. In this way, the method ensures that adequate battery power is available to transfer the contents of the cache to a non-volatile data storage medium.

35 Claims, 8 Drawing Sheets

METHOD AND SYSTEM FOR DYNAMICALLY ADJUSTING STORAGE SYSTEM WRITE CACHE BASED ON THE BACKUP BATTERY LEVEL

FIELD OF THE INVENTION

The present invention relates to cache levels. More particularly, embodiments of the present invention provide a method and system for managing cache levels relative to backup battery levels.

BACKGROUND OF THE INVENTION

Today's computer networks are usually comprised of multiple interconnected computer systems. Some of the computer systems are configured for use by individuals/users. These computer systems are normally referred to client or local computer systems. Other computer systems, also present within the network, are configured to facilitate the interaction between the client or local computer systems and the network to which they are connected. These other computer systems are commonly referred to as server or host computer systems. Additionally, it is common for many of today's large companies to have hundreds or thousands of servers and client computer systems exchanging information.

Further, both the server and client computer systems generate vast amounts of data containing a nearly endless variety of information. Portions of the data can contain information that can be deemed mission critical and needs to be archived in some manner.

Currently there are numerous types of data storage systems that are designed to store the vast amounts of data. Examples of various data storage systems can include, but ate not limited to, tape backup, disk mirroring, CD storage, multiple intercoupled storage devices, and others.

A commonality among many types of data storage systems is the requirement of a power source, e.g., AC mains. Another similarity among many types of data storage systems is that data is first placed in a buffer or cache memory before it is written to the storage device or to the array of storage devices.

However, it is unrealistic to presume that AC mains will never cease to function. Brown-outs or black-outs, natural disasters, acts of terrorism, power generator failures, fires, and downed power lines, are but a few of the types of occurrences that can cause AC mains to become temporarily non-functional. Further, when an AC main fails, it is quite common for any information that was placed in cache to be lost. This is especially disadvantageous for important information that had yet to be written to a non-volatile data storage medium To overcome this disadvantage, many data storage devices are coupled with a UPS (uninterruptible power supply) that provides power when there is an AC main failure. Another method of providing backup power includes placing batteries on the computer system board. Yet another method of providing backup power is to place a battery on the controller, and in this method, when the system is rebooted, there is an image of the data that was placed in the cache, which is then regenerated.

A disadvantage to this is that if there is an extended outage, e.g., from 96 to 120 hours, and by virtue of the backup power having a finite amount of energy stored therein, the energy contained in the backup power device may become exhausted, thus causing a loss or corruption of the information.

An additional disadvantage is that backup batteries can, over time, lose some of their ability to provide a consistent backup charge. It is common for backup batteries not to remain fully charged. Accordingly, if an AC main goes down, there is a possibility that the backup battery may not have enough energy to enable writing of the buffer or cache memory before battery power is exhausted.

High current batteries, e.g., NiCad batteries, have been used mainly in the power tool arena and other low tech, non-mission critical environments. Further, high tech battery applications have been utilized in laptop batteries, which do not require the high current, high temperature demand of large storage systems, e.g., rack mounted systems.

SUMMARY OF THE INVENTION

Thus a need exists for a method to monitor charge level of a backup battery. A further need exists for a method to adjust the amount of available cache predicated upon the amount of charge available in a backup battery. An additional need exists for a method that can adjust the cache levels so that there is enough energy stored in the backup battery to ensure proper writing of the data to a relatively permanent storage media prior to the battery exhausting its retained energy. Yet another need exists for a system that provides backup battery power and which can monitor the energy levels therein as well as being able to adjust the amount of available cache to ensure there is enough energy to write the data to a relatively permanent storage media.

Embodiments of the present invention are drawn to providing a method and system for managing cache levels in a dynamic manner relative to a charge level in a battery backup system.

In one embodiment, the method comprises measuring the level of charge stored in an exhaustible power source. The method further comprises monitoring the level of charge stored in the exhaustible power source. The method further comprises adjusting the storage level of the volatile cache in response to a detected change in the level of charge in the power source. The level of charge is sufficient to allow transfer of any data in the cache memory to a non-volatile storage medium.

In one embodiment, the system comprises a measuring device coupled to an exhaustible power source. The system further comprises a controller coupled to the exhaustible power source. A volatile memory unit, e.g., a cache unit, is coupled to the controller and the exhaustible power source. The system further comprises a non-volatile memory unit, e.g., a hard drive disk. The non-volatile memory unit is coupled to the controller and the exhaustible power source. The volatile memory unit stores data in varying amounts relative to varying amounts of energy stored in the exhaustible power source as measured by the measuring device. The exhaustible power source provides sufficient energy to enable transference of data stored in the volatile memory unit to the non-volatile memory unit prior to the energy stored in the exhaustible power source being exhausted.

In one embodiment, the invention can be applied in a redundant disk storage system having a redundant array of individual disks, a disk cache, and a controller unit. The system has back-up batteries the charge of which can be monitored. The size of the disk cache can be adjusted in response to the measured level of charge of the batteries. In dual systems where two controllers and two caches are provided, the sizes of the caches are adjusted based on both battery systems.

These and other objects and advantages of the present invention will become obvious to those of ordinary skill in the art after having read the following detailed description of the preferred embodiments illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

A method and system for dynamically adjusting a storage system write cache relative to backup battery levels is described. In the following description, for purposes of explanation, numerous specific details are set forth in order to provide a thorough understanding of the present invention. It will be obvious, however, to one skilled in the art that the present invention may be practiced without these specific details. In other instances, well known and structures and devices are shown in block diagram form in order to avoid obscuring the present invention.

The present invention is discussed primarily in the context of a network of computer systems, e.g., servers, workstation, desktop, and laptop computer systems. However, it is noted that the present invention can be used with other types of devices that have the capability to access some type of central device or central site, including but not limited to handheld computer systems, cell phones, pagers, and other electronic devices which are adapted to provide Internet and Intranet access.

Figure 1A:
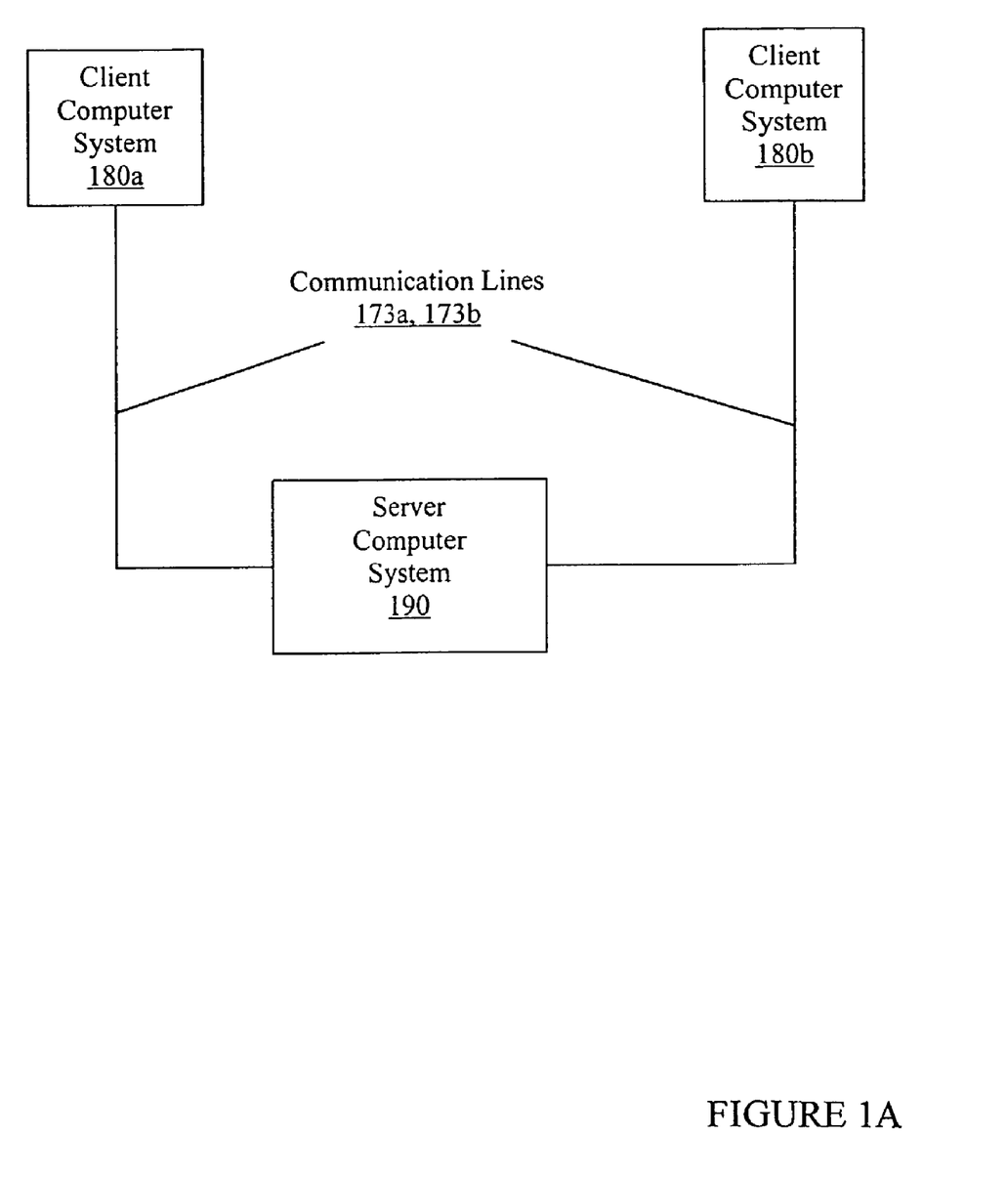
FIG. 1A is a block diagram of network environment upon which embodiments of the present invention can be practiced.

FIG. 1A is a block diagram illustrating a client-server computer system network 100 ("network 100") upon which embodiments of the present invention may be practiced. Network 100 may be a communication network located within a firewall of an organization or corporation (an "Intranet"), or network 100 may represent a portion of the World Wide Web or Internet. Client (or user) computer systems 180a and 180b and server computer system 190 are communicatively coupled via communication lines 173a and 173b; the mechanisms for coupling computer systems over the Internet or over Intranets are well-known in the art. For instance, this coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, an ATM (Asynchronous Transfer Mode). Alternatively, client computer systems 180a and 180b can be coupled to server computer system 190 via an input/output port (e.g., a serial port) of server computer system 190; that is, client computer systems 180a and 180b and server computer system 190 may be non-networked devices. It is appreciated that, for illustration, only two client computer systems and a single server computer system are shown; however, it is understood that network 100 may comprise any number of client computer systems and server computer systems.

Figure 1B:
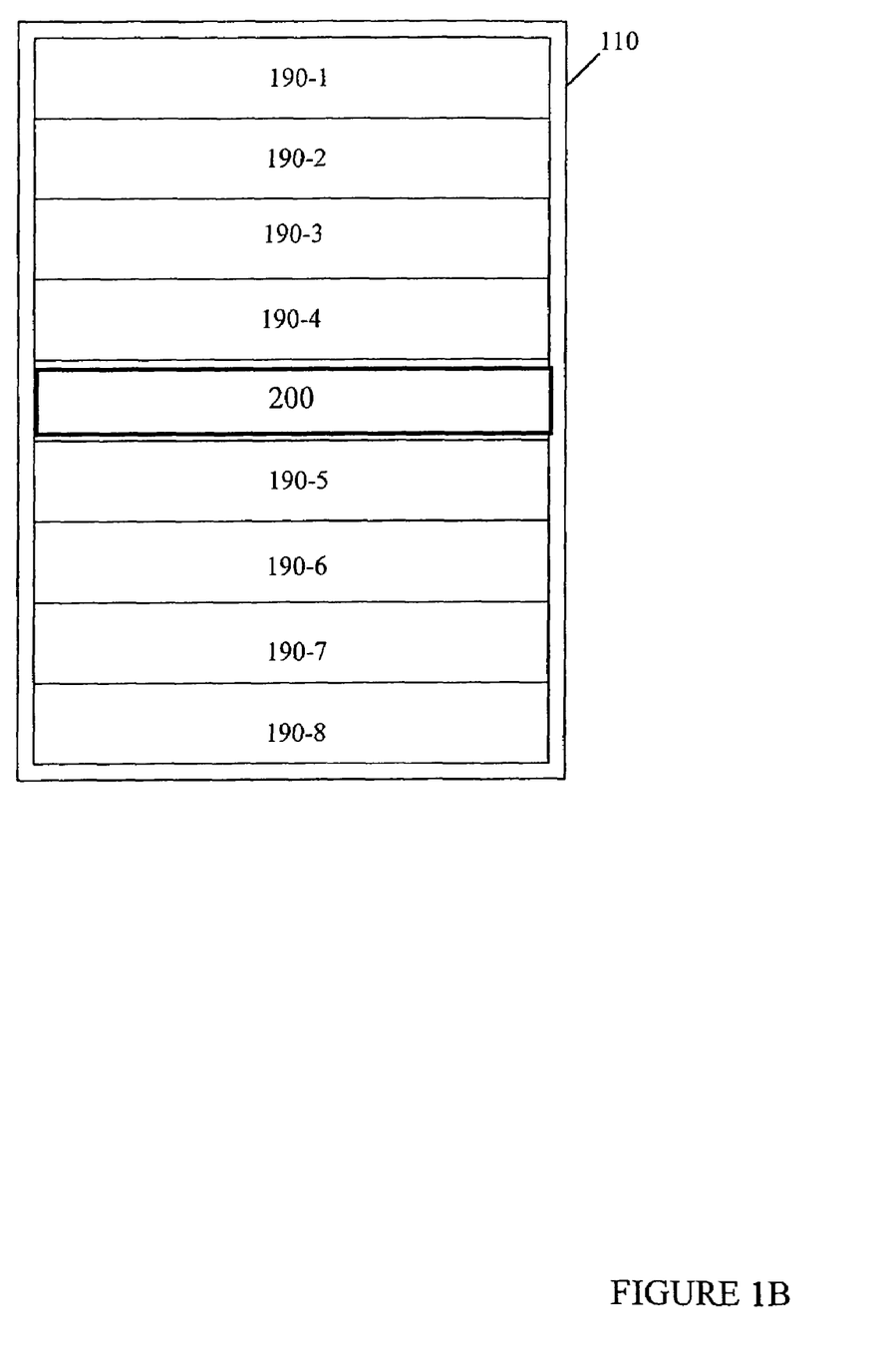
FIG. 1B is a block diagram of a network storage housing upon which embodiments of the present invention can be practiced.

FIG. 1B is a block diagram illustrating a network storage housing 110 upon which embodiments of the present invention may be practiced. FIG. 1B shows, in one embodiment, network storage housing 110 having disposed therein a plurality of servers, e.g., server 190 of FIG. 1A, and which are indicated as servers 190-1 to 190-8. Also shown in FIG. 1B is a system 200, analogous to system 200 of FIG. 2. System 200 is configured to provide cooling and operating power to each instancing of server 190 disposed within network storage housing 110 when conventional power service, e.g., power from AC mains, is interrupted and/or fails.

Figure 4A:
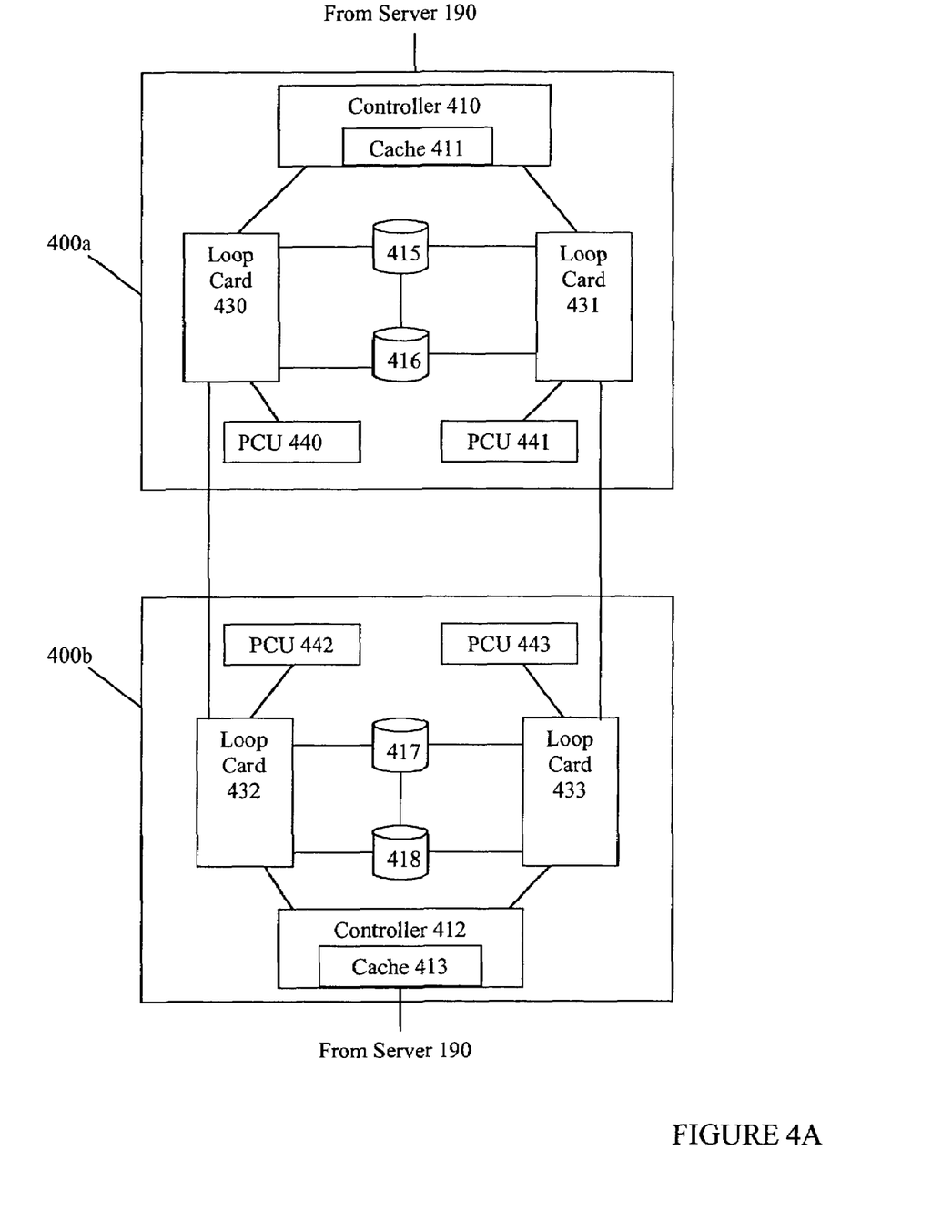
FIG. 4A is a block diagram illustrating a plurality of systems for adjusting cache levels relative to charge levels of an exhaustible power source coupled together in a partner pair configuration, in accordance with one embodiment of the present invention.
Figure 4B:
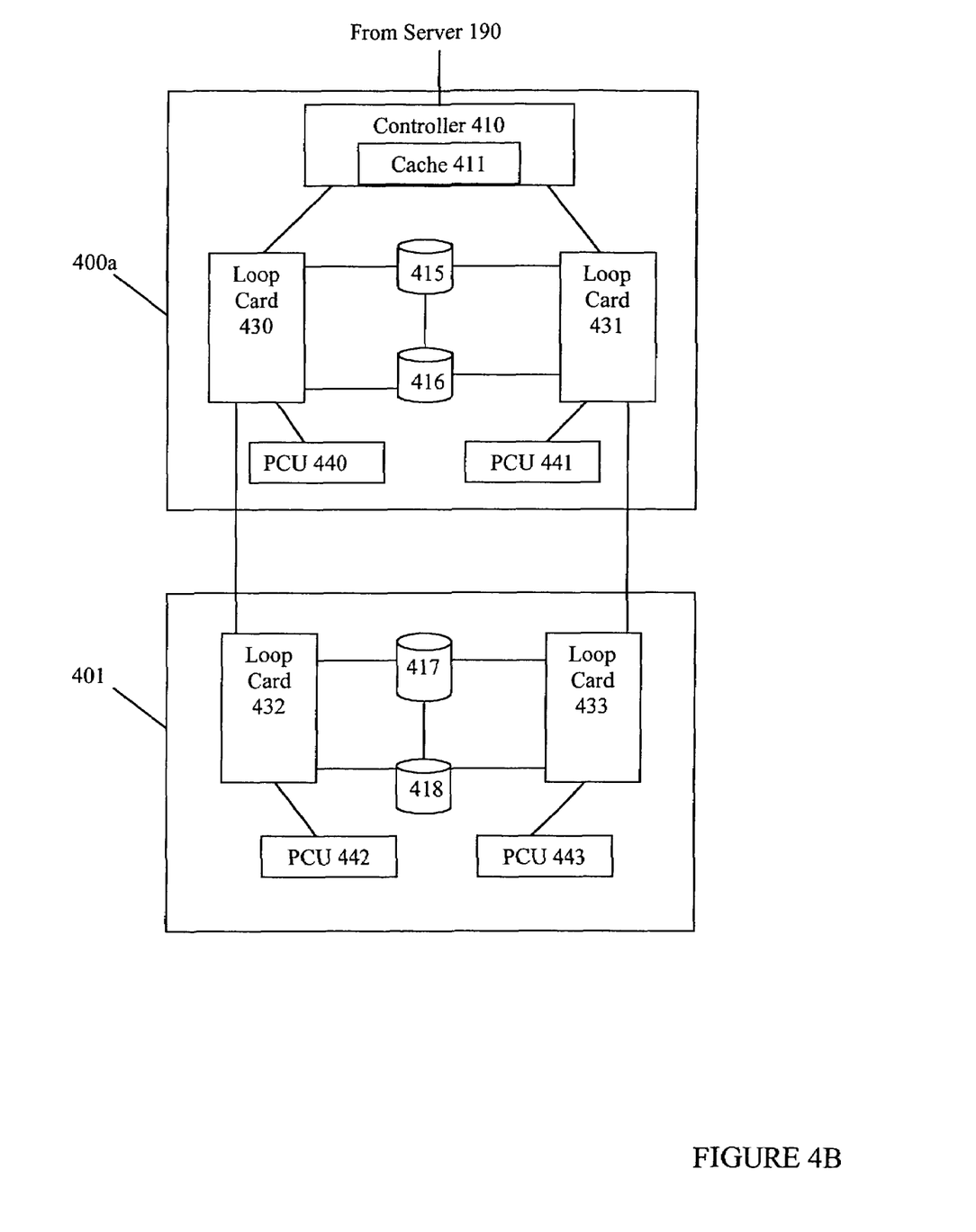
FIG. 4B is a block diagram illustrating a plurality of systems for adjusting cache levels relative to charge levels of an exhaustible power source coupled together in a unified cache configuration, in accordance with one embodiment of the present invention.

Still referring to FIG. 1B, in one embodiment, network storage housing 110 is rack mounted RAID (redundant array of inexpensive disks) data storage system. It is noted that embodiments of the present invention are well suited to be implemented in nearly any data storage system. It is further noted that although network storage housing 110 is shown having eight servers disposed therewith, servers 190-1 to 190-8, respectively, network storage housing 110 can have nearly any number of servers disposed therewith. As such, the number of servers instanced in FIG. 1B should not be construed as limiting. Further, as additional servers 190 are incorporated into network storage housing 110, additional systems 200 can be incorporated therein, as shown in FIGS. 4A and 4B.

Figure 2:
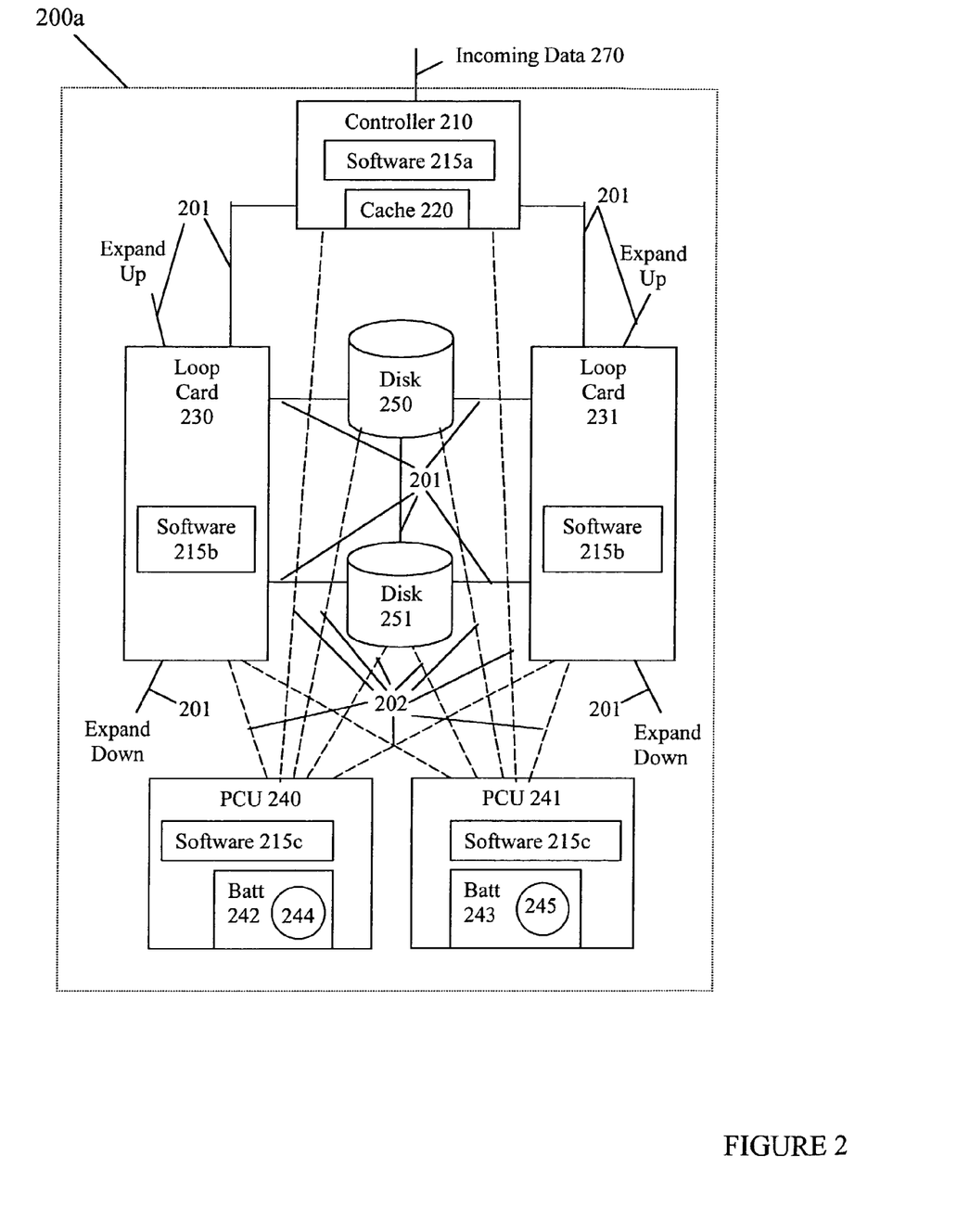
FIG. 2 is a block diagram of circuitry and components of a system for adjusting cache levels relative to charge levels of an exhaustible power source, in accordance with one embodiment of the present invention.

With reference to FIG. 2, portions of the present invention are comprised of computer-readable and computer executable instructions, e.g., software 215, of which portions, e.g., software portions 215a, 215b, and 215c, reside, for example, in computer-readable media of an electronic system, e.g., system 200.

FIG. 2 is a block diagram of a system 200a for providing auxiliary power to a data storage system, in one embodiment of the present invention. In one embodiment, system 200a is implemented in a data storage system, e.g., a rack mounted RAID (redundant array of inexpensive disks) system. It is noted that embodiments of the present invention are well suited to be implemented in nearly any type of data storage system including, but not limited to, a rack mounted RAID system.

FIG. 2 shows a controller 210 having a volatile memory unit, e.g., cache 220 disposed therewith, in one embodiment. Shown coupled to controller 210 are loop cards 230 and 231 via a data pathway, e.g., bus 201. Coupled to loop cards 230 and 231, also via bus 201, are non-volatile data storage devices, e.g., disks 250 and 251. It is noted that either loop card is able to communicate with any of the data storage devices coupled therewith. In one embodiment, disks 250 and 251 are large capacity rotating magnetic non-volatile data storage devices, e.g., hard disk drives. In another embodiment, disks 250 and 251 are large capacity rotating optical non-volatile data storage devices, e.g., writeable or re-writeable CDs or DVDs. Other types of large capacity non-volatile data storage devices can also be utilized. PCUs (power cooling units) 240 and 241, such as a PCU commercially available from Delta Electronics Inc. of Taiwan, Republic of China, are coupled with controller 210, loop cards 230 and 231 and disks 250 and 251, via an electrical pathway, e.g., power bus 202. It is noted that other functionally analogous PCUs can be so implemented.

Still referring to FIG. 2, PCU 240 is shown to have coupled therewith an exhaustible power source, e.g., battery 242. PCU 241 is shown to have coupled therewith an exhaustible power source, e.g., battery 243. In one embodiment, batteries 242 and 243 of PCU 240 and 241, respectively, are analogous in charge capacity and functionality and are configured with respective monitoring devices, e.g., gauges 244 and 245, respectively. Gauges 244 and 245 are adapted to measure levels of charge in batteries 242 and 243, respectively. In one embodiment, a gauge, e.g., gauges 244 and 245, can display levels of charge in a digital manner. In another embodiment, a gauge, e.g., gauges 244 and 245, can display levels of charge in an analog manner. In one embodiment, a gauge can display charge levels as an energy value in a battery, battery 242 or 243. In another embodiment, a gauge can display charge levels as a percentage of charge level capacity of a battery. In one embodiment, batteries 242 and 243 are NiMH (nickel metal hydride) type batteries. The gauges 244 and 245 are able to report the level of charge on the batteries by an electronic signal that can be computer read.

In one embodiment, the storage capacity of cache 220 can range from 256 MBs (megabytes) to 2 GBs (gigabyte). In another embodiment, cache 220 capacity can be less than 256 MBs. In another embodiment, cache capacity can be greater than 2 GBs. In one embodiment, portions of cache 220 can be adapted for a particular use, and the sizes of those portions are adjustable. In accordance with the present invention, the portions are adjusted relative to the level of charge stored in PCUs 240 and 241. For example, cache 220 can have a capacity of 1.5 GB of which a 512 MB portion is allocated for dirty data. Dirty data is that data that is to be written to a non-volatile memory device, e.g., disk 250 or disk 251, but in which the writing has yet to occur.

PCU 240 and 241 are configured to provide power and cooling to controller 210, loop cards 230 and 231, and disks 250 and 251, in the event that normal continuous power, e.g., power supplied by AC mains, is interrupted. It is noted that each individual PCU, e.g., PCUs 240 and 241, contains sufficient energy to solely provide operating power and sufficient cooling to controller 220, loop cards 230 and 231, and disks 250 and 251.

Still referring to FIG. 2, computer implemented instructions, e.g., software 215, is shown as having a portion thereof disposed in controller 210, e.g., software 215a, and a portion disposed in loop cards 220 and 230, e.g., software 215b, and a portion disposed in PCUs 240 and 241, e.g., software 215c. It is noted that software 215 is, in one embodiment, stored in a non-volatile memory device, e.g., a ROM chip.

Through data study, it is known that a PCU (240, 241) can provide a certain amount of power for a defined period of time, dependent upon the capacities and characteristics of the components to which it is coupled. Components with larger capacities require more power, and vice versa. It is further known that it takes a particular period of time to flush (write) the dirty cache portion of cache 220 to a disk. PCUs 240 and 241 are configured, in one embodiment, to provide sufficient power to the components to which it is coupled to enable flushing of the cache 220 to disks (151, 152) before charge levels in batteries 242 and 243 are exhausted.

For example, assume cache 220 has a capacity of 1 GB. Cache 220 is configured with a 256 MB portion thereof allocated for dirty data. In the present example, it is known that it requires approximately six minutes to flush (write) the 256 MBs of data in cache 220 to a disk, e.g., disk 151 or 152. A controller, e.g., controller 210 receives a signal output from gauges 244 and 245 regarding the level of charge in batteries 242 and 243 in PCUs 240 and 241 respectively. Monitoring code within software 215a then interprets the data received from gauges 244 and 245, and as a proportion of the maximum level of charge contained in batteries 242 and 243, adjusts the dirty data portion of cache 220 accordingly based on the reported charge level, in this example, 256 MBs.

Still referring to the above example, assume both batteries, e.g., battery 242 of PCU 240 and battery 243 of PCU 241, can provide six minutes of power when fully charged.

Gauge 244 measures a charge level in battery 242 which equates to four minutes of power, which is outputted to controller 210. This indicates a charge level reduction of approximately thirty-three percent of battery 242 in PCU 240. Gauge 245 measures a charge level in battery 243 which equates to three minutes of power, which is also outputted to controller 210. This indicates a charge level reduction of approximately fifty percent of battery 243 of PCU 241.

Software 215a, coupled with controller 210 then initiates an adjustment of the size of the dirty data portion of cache 220 relative to the battery with the lowest charge level. Accordingly, the dirty data portion of cache 220 is reduced from 256 MBs to approximately 128 MBs, a reduction of approximately fifty percent. By reducing the dirty data portion of cache 220 proportional to an amount of change in the charge level of the battery with the lowest charge level, system 200 can ensure sufficient power to flush cache 220 to disk (150, 151) prior to charge levels of batteries 242 and 243 becoming exhausted.

If, in another example, gauge 244 still measures a charge level equating to four minutes, but gauge 245 measures a charge level in battery 243 which equates to five minutes of power. This indicates a charge level reduction of approximately seventeen percent of battery 243 of PCU 241. Accordingly, the dirty data portion of cache 220 is reduced from 256 MBs to approximately 171 MBs, a reduction equivalent to the thirty-three percent reduction of the charge level, because battery 242 has the lowest charge level.

Still referring to FIG. 2, software 215 further comprises instructions which, in one embodiment, are disposed in software portion 215a, and which enable an automatic flushing of dirty data in cache 220 to a disk, e.g., disk 250 or 251, when the amount of dirty data in cache 220 reaches a level that would require a longer time to flush than the operational time that can be provided by a battery, e.g., battery 242 or 243, prior to a battery exhausting the charge contained therein.

Figure 3:
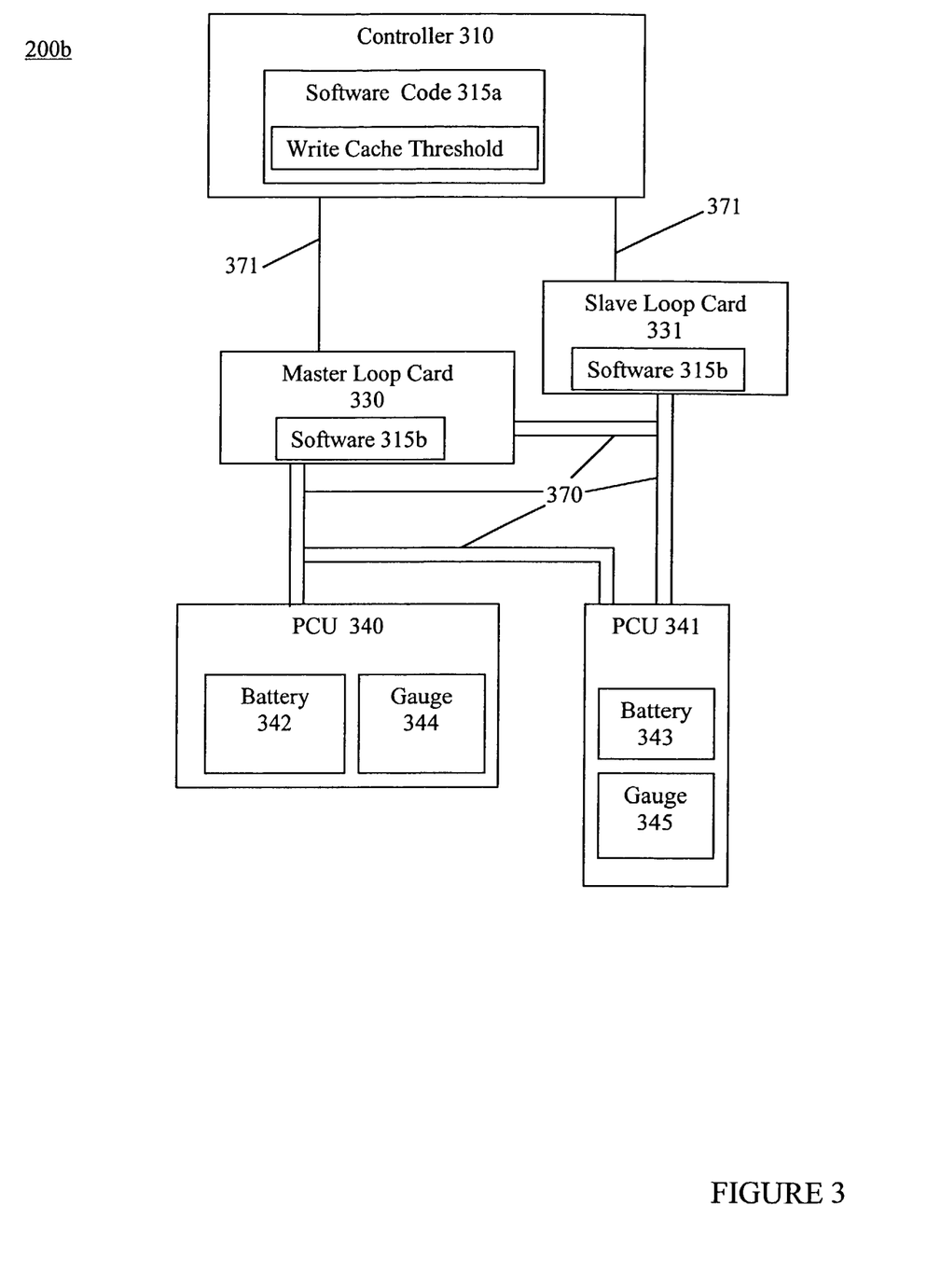
FIG. 3 is block diagram of circuitry and components of a system for adjusting cache levels relative to charge levels of an exhaustible power source, in accordance with one embodiment of the present invention.

FIG. 3 is a schematic block diagram illustrating components and circuitry in a system 200b, in an alternate embodiment of the present invention. Controller 310 is analogous to controller 210 of FIG. 2. Controller 310 is coupled with master loop card 330 via bus 371. Master loop card 330 is analogous to loop cards 230 and 231 of FIG. 2. In one embodiment, bus 371 is an RS 232 serial bus. It is noted that other bus protocols can be utilized including, but not limited to, USB, Firewire, parallel, and others. PCU 340 is analogous to PCU 240 and/or PCU 241 of FIG. 2.

Still referring to FIG. 3, also shown is slave loop card 331 coupled to controller 310 via bus 371. Slave loop card 331 is analogous to loop cards 230 and 231. Coupled to slave loop card is PCU 341, via bus 370. PCU 341 is also coupled with master loop card 330. In one embodiment, bus 370 is a two wire bus, such as an SM (smart bus) type bus. Bus 370, in one embodiment, is compatible with $I^2C$ bus protocols.

Referring collectively to FIGS. 4A and 4B, shown are two examples of a plurality of systems 200, e.g., 400a and 400b, implemented to provide capacity and function expandability, enabling additional servers 190 to be coupled therewith, in accordance with other alternative embodiments of the present invention.

FIG. 4A is block diagram illustrating a plurality of systems 200, e.g., 400a and 400b, coupled together in a partner pair configuration, in one embodiment of the present invention. Systems 400a and 400b are functionally analogous to system 200 of FIG. 2. In a partner pair configuration, each system coupled therewith is analogous to the other, with each system 400a and 400b having its own controller and analogously sized cache, e.g., cache 411 of system 400a and cache 413 of system 400b.

It is further noted that, although not shown, each PCU, e.g., PCUs 440, 441, 442, and 443, is coupled with each component, controllers 410 and 411, loop cards 430, 431, 432, and 433, and disks 415, 416, 417, and 418, as is shown in FIG. 2. Each PCU contains sufficient charge capacity to provide operating power to each component enabling flushing of dirty data in cache 411 and cache 413, when AC main service is subject to interruption or failure. It is further noted that the capacities of cache 411 and 413 are adjusted in proportion to the PCU, 440, 441, 442 or 443, which has the least level of charge in its respective battery. Thus, systems 400a and 400b can provide sufficient power to enable writing of dirty data in cache 411 and 412 to disks 415, 416, 417, and 418, prior to the charge level of the battery becoming exhausted.

FIG. 4B is a block diagram illustrating a plurality of systems 400a and 401 coupled together in a unified cache configuration, in one embodiment of the present invention. In this example, a system 400a, analogous to a system 200 of FIG. 2 is coupled with a system 401. System 401 is shown having the components of system 200 with the exception of a controller and a cache, as seen in system 400a. In this example, both systems 400a and 401 use the same controller, controller 411, and the same cache, cache 411. This configuration increases the amount of non-volatile storage, while being restricted to the amount of cache as determined by controller 410.

Still referring to FIG. 4B, it is noted that, although not shown, each PCU, e.g., PCUs 440, 441, 442, and 443, is coupled with each component, controllers 410 and 411, loop cards 430, 431, 432, and 433, and disks 415, 416, 417, and 418, as is shown in FIG. 2. Each PCU contains sufficient charge capacity to provide operating power to each component enabling flushing of the dirty data in cache 411 when AC main service is subject to interruption or failure. It is further noted that the capacity of cache 411 is adjusted in proportion to the PCU, 440, 441, 442 or 443, that has the least level of charge in its respective battery. Thus, systems 400a and 401 can provide sufficient power to enable writing of dirty data in cache 411 and 412 to disks 415, 416, 417, and 418, prior to the charge level of the battery becoming exhausted.

Figure 5:
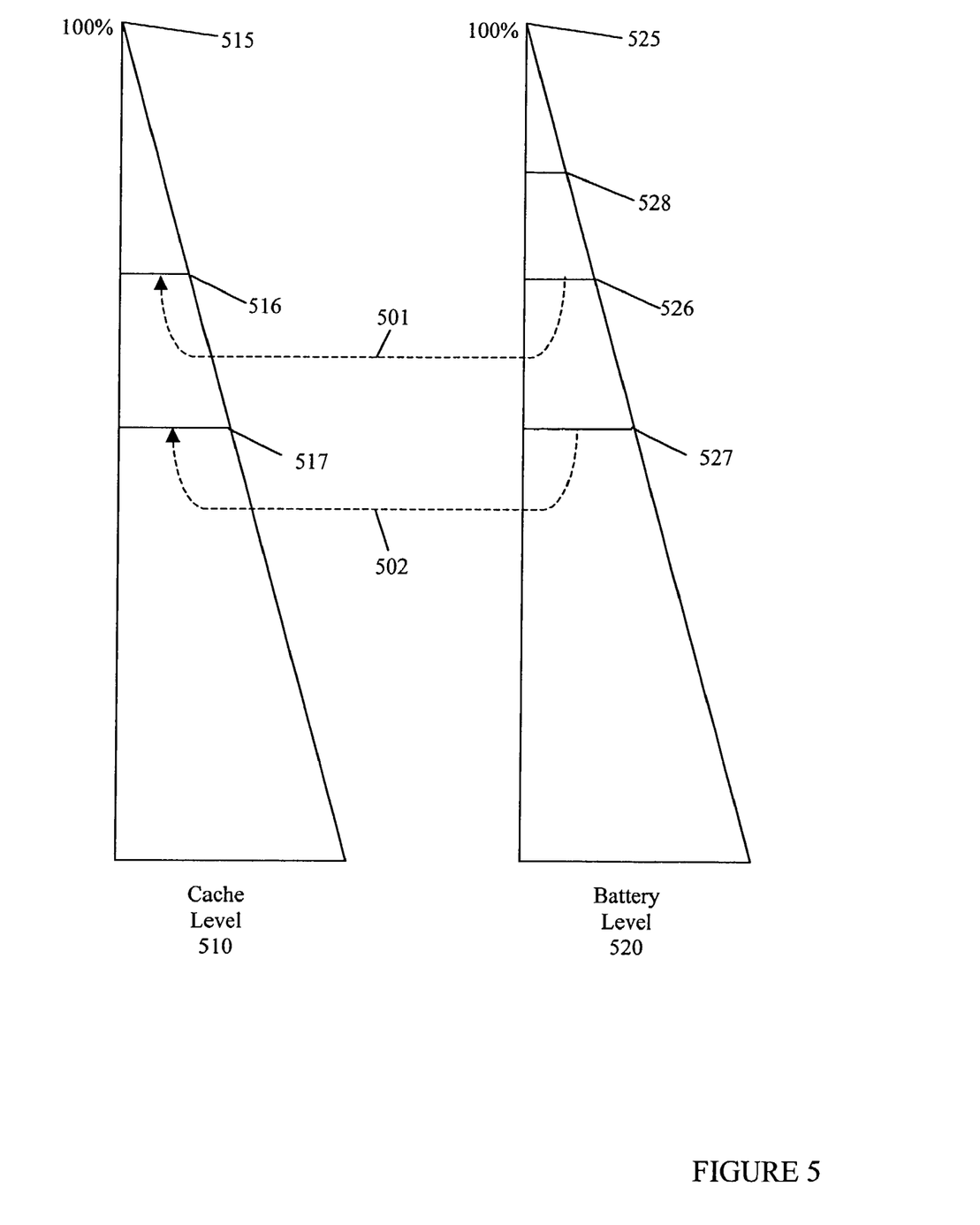
FIG. 5 is a diagram illustrating a relative relationship between cache storage levels and charge levels of an exhaustible power source, in accordance with one embodiment of the present invention.

FIG. 5 is an illustration of that portion of cache, e.g., cache 220, that is allocated for dirty data storage, e.g. cache level 510, in one embodiment of the present invention, that is adjusted in proportion to the level of charge, charge level 520, contained within the PCU which has the lowest charge level in its respective battery. Cache level 510 represents the amount of cache 220 (FIG. 2) allocated for dirty data and battery level 520 represents the level of charge in the battery, e.g., battery 242 or battery 243 (FIG. 2) that has the lowest level of charge. In this example, cache level 510 has a capacity of 500 MBs allocated for dirty data, and it is known that it requires ten minutes to flush the dirty data in cache level 510 to a disk, e.g., disks 150 and 151. Further, batteries 242 and 243 have a maximum charge capacity to provide ten minutes of operational power to system 200 of FIG. 2.

Still referring to FIG. 5 and to example 501 (dotted line), if gauge 244 reports that the level of charge of battery 242 is approximately one third less than maximum, indicated by line 526, and gauge 245 indicates the level of charge of battery 243 is approximately one quarter less than maximum, indicated by line 528, the amount allocated in cache 510 for dirty data storage is reduced by a proportional amount relative to the battery having the lower level of charge. Because battery 242 has the lower level of charge, in this example 33% as indicated by line 526, the capacity of cache level 510 is reduced by 33%, as indicated by line 516.

In another example, example 502 (dotted line), if gauge 244 reports that the level of charge of battery 242 is approximately one third less than maximum, indicated by line 526, and gauge 245 indicates the level of charge of battery 243 is approximately one half less than maximum, indicated by line 527, the amount allocated in cache 510 for dirty data storage is reduced by a proportional amount relative to the battery having the lower level of charge. Because battery 243 has the lower level of charge, in this example 50% as indicated by line 527, the capacity of cache level 510 is reduced by 50%, as indicated by line 517.

It is noted that when the amount dirty data stored in cache 220 requires more time to flush than can be sufficiently provided by a PCU, e.g., PCU 240, an automatic flushing of dirty data to a disk, e.g., disk 150 and/or 151 will occur.

Figure 6:
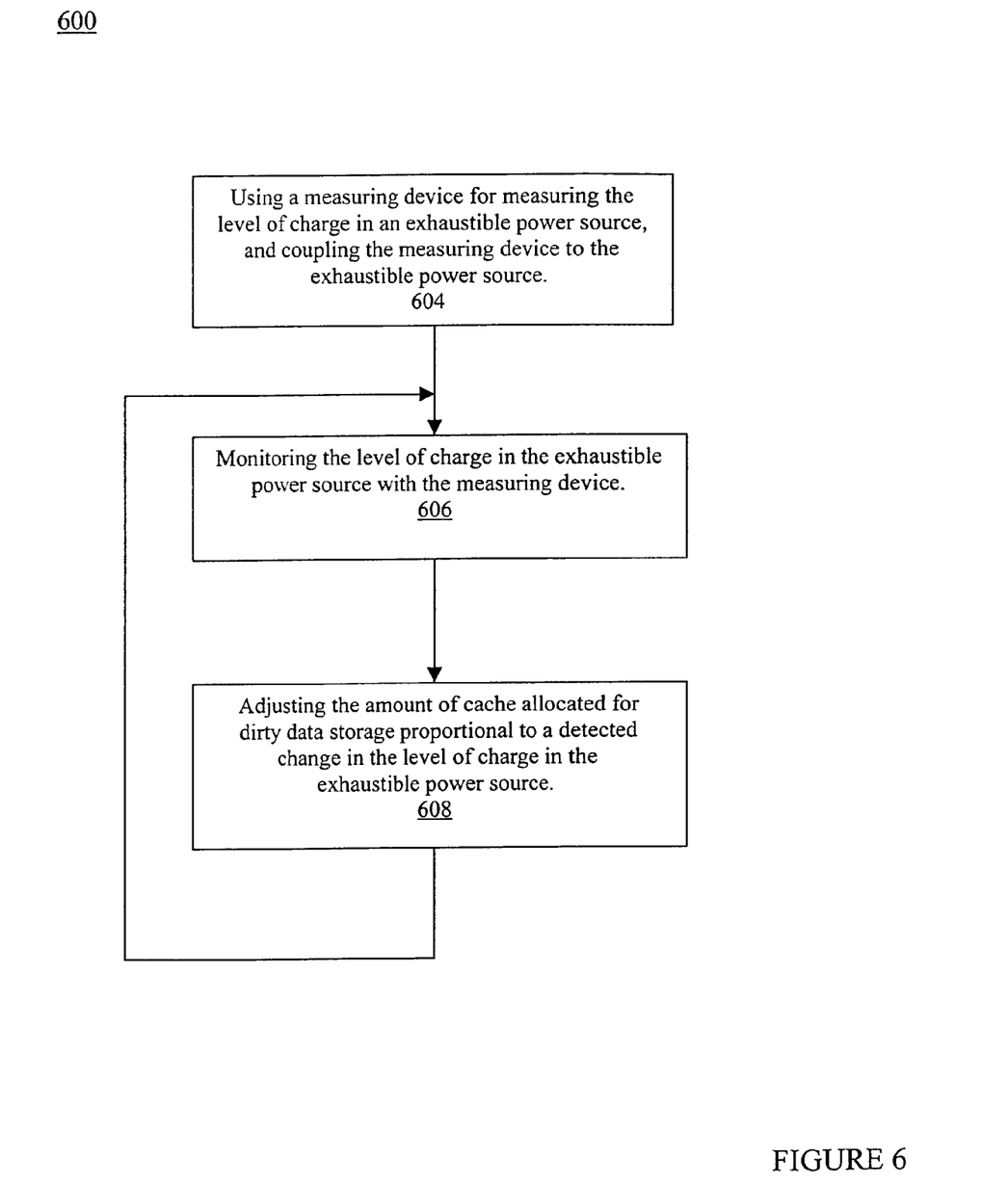
FIG. 6 is flowchart of steps in a process for adjusting cache levels relative to charge levels in an exhaustible power source, in accordance with one embodiment of the present invention.

FIG. 6 is a flowchart 600 of steps performed in accordance with one embodiment of the present invention for adjusting cache levels in proportion to a level of charge in a battery backup. Flowchart 600 includes processes of the present invention which, in one embodiment, are carried out by electrical components under the control of computer readable and computer executable instructions. The computer readable and computer executable instructions reside, for example, in data storage features such as computer usable non-volatile memory of FIG. 2. However, the computer readable and computer executable instructions may reside in any type of computer readable medium. Although specific steps are disclosed in flowchart 600, such steps are exemplary. That is, the present invention is well suited to performing various other steps or variations of the steps recited in FIG. 6. Within the present embodiment, it should be appreciated that the steps of flowchart 600 may be performed by software, by hardware or by any combination of software and hardware, and may be executed on an embedded computer system.

In step 604 of FIG. 6, a measuring device, e.g., gauge 244, for measuring level of charge in an exhaustible power source, e.g., battery 242, is provided, in one embodiment of the present invention. The measuring device is coupled with the exhaustible power source. In one embodiment, the exhaustible power source is disposed within a PCU (power cooling unit), e.g., 240, which is adapted to provide cooling and operating power when an AC main fails.

In step 606 of FIG. 6, the measuring device, in one embodiment, is used to monitor the level of charge in the exhaustible power source to which it is coupled. When a plurality of exhaustible power sources are present, a measuring device is coupled to each exhaustible power source. In one embodiment, instructions, e.g., software 215a of FIG. 2, periodically initiate measuring of the level of charge, thus providing input regarding the level of charge in the exhaustible power source or sources.

In step 608 of FIG. 6, the amount of cache allocated for dirty data is adjusted in response to a detected change in level of charge. When the level of charge in the battery having the lower level of charge has decreased, the amount of cache allocated for storing dirty data is proportionately reduced. When the level of charge in the battery having the lower level of charge has increased, the amount of cache allocated for storing data is proportionately increased, up to the maximum amount of cache allocated for the storing of dirty data. It is noted that if the battery having the lower level of charge increases to level of charge that is now higher than the other battery, the other battery is considered the battery with the lower level of charge, and the amount of cache allocated for dirty data is adjusted accordingly.

In conclusion, by providing a method and system to manage the amount of cache allocated for the storage of dirty data in proportion to a level of charge of an exhaustible power source, embodiments of the present invention ensure there is sufficient charge retained in the exhaustible power source to enable flushing (writing) of the dirty data, stored in a volatile manner, to a non-volatile data storage device prior to the exhaustible power source becoming exhausted. This provides a measure of protection against mission critical data being lost when AC main power is interrupted or fails.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of adjusting a cache memory storage level comprising:

measuring the level of charge stored in an exhaustible power source;

monitoring said level of charge stored in said exhaustible power source; and automatically adjusting storage level capacity of said cache memory in response to a detected change in said level of charge, wherein said level of charge is sufficient to allow transfer of any data in said cache memory to a non-volatile memory medium.

2. The method as recited in claim 1 wherein said automatically adjusting comprises increasing storage level capacity of said cache memory concurrent with a detected increase in said level of charge, wherein said increasing is performed in proportion to said detected increase in said level of charge.

3. The method as recited in claim 1 wherein said automatically adjusting comprises decreasing storage level capacity of said cache memory concurrent with a detected decrease in said level of charge, wherein said decreasing is performed in proportion to said detected decrease in said level of charge.

4. The method as recited in claim 1 wherein said exhaustible power source comprises a plurality of exhaustible power sources and wherein said monitoring comprises comparing measured charge levels of said plurality of exhaustible power sources.

5. The method as recited in claim 4 wherein said adjusting comprises adjusting said storage level capacity of said cache memory in proportion to the charge level of the exhaustible power source with the lowest charge level.

6. The method as recited in claim 1 further comprising writing contents of said cache memory to a non-volatile data storage entity.

7. The method as recited in claim 1 wherein said exhaustible power source is a rechargeable battery.

8. The method as recited in claim 1 wherein said exhaustible power source is a replaceable battery.

9. The method as recited in claim 1 further comprising initiating a write process of data stored in said cache memory to a non-volatile storage medium when the amount of data stored in said cache memory requires a greater amount of time to be written to said non-volatile storage medium than can be supplied by said level of charge of said exhaustible power source.

10. An apparatus for adjusting cache levels comprising:
a measuring device coupled to an exhaustible power source;
a controller coupled to said exhaustible power source;
a volatile memory unit coupled to said controller; and
a non-volatile memory unit coupled to said controller, wherein said volatile memory unit stores data in varying amounts relative to varying amounts of energy stored in said exhaustible power source as measured by said measuring device, wherein said exhaustible power source provides sufficient energy to enable transference of said data stored in said volatile memory unit to said non-volatile memory unit.

11. The apparatus as described in claim 10 further comprising a loop interface for enabling communication between said controller and said non-volatile memory unit, said loop interface coupled with said controller and said non-volatile memory unit and said exhaustible power source.

12. The apparatus of claim 10 further comprising a processor for adjusting the level of said volatile memory unit to a level proportional to said level of charge.

13. The apparatus of claim 12 wherein said processor is within said controller.

14. The apparatus of claim 10 wherein said measuring device measures charge level stored in said exhaustible power source.

15. The apparatus of claim 12 wherein said exhaustible power source comprises a plurality of exhaustible power sources and wherein said processor enables comparison of measured charge levels in said plurality of exhaustible power sources and for adjusting levels of said volatile memory unit proportional to the exhaustible power source having the lowest level of charge.

16. The apparatus of claim 10 wherein said exhaustible power source is for supplying operating power to said controller and to said volatile memory unit and to said non-volatile memory unit when optimal sources of power are not available.

17. The apparatus of claim 10 further comprising a processor for initiating a write process of data stored in said volatile memory unit with the amount of data in said volatile memory unit requires more time to write to said non-volatile memory unit than can be provided by said exhaustible power source.

18. The apparatus of claim 10 wherein said exhaustible power source is a rechargeable battery.

19. The apparatus of claim 10 wherein said exhaustible power source is a replaceable battery.

20. A system for adjusting cache level comprising:
an exhaustible power source means;
means for measuring charge level in said exhaustible power source means, said means for measuring coupled to said exhaustible power source means;
volatile storage means coupled with said exhaustible power source means; and
means for controlling the amount of data that can be stored in said volatile storage means relative to said level of charge in said exhaustible power source means as measured by said means for measuring charge level in said exhaustible power source means.

21. The system as describe in claim 20 further comprising:
means for detecting a change in level of charge in said exhaustible power source means.

22. The system as described in claim 21 wherein said means for detecting also is for increasing the amount of data that can be stored in said volatile storage means in response to a measured increase in charge level in said exhaustible power source means.

23. The system as described in claim 21 wherein said means for detecting also is for decreasing the amount of data that can be stored in said volatile storage means in response to a measured increase in charge level in said exhaustible power source.

24. The system as described in claim 20 further comprising:
non-volatile storage means coupled with said means for controlling.

25. The system as described in claim 20 further comprising:
means for transferring data stored in said volatile storage means to said non-volatile storage means using power from said exhaustible power source means.

26. The system as described in claim 20 further comprising:
means for recharging said exhaustible power source means.

27. The system as described in claim 20 further comprising:
means to initiate a write process of data in said volatile storage means to said non-volatile storage means when the amount of data stored in said volatile storage means requires more time to be written to said non-volatile storage means than can be provided by said exhaustible power source means.

28. The system as described in claim 20 further comprising:
means for comparing measured charge levels in a plurality of exhaustible power source means.

29. The system as described in claim 20 further comprising:
means for adjusting the amount of data that can be stored in said volatile storage means in proportion to the exhaustible power source means having the lowest measured charge level.

30. A data storage system comprising:
a non-volatile storage medium;
a volatile memory cache for temporarily storing data to be written to said non-volatile storage medium;
an exhaustible energy storage unit for providing backup power;
an energy monitoring unit for monitoring an energy level of said exhaustible energy storage unit;
a controller for controlling data written into said volatile memory cache and for controlling data written on said non-volatile storage medium; and
logic, coupled to said energy monitoring device, for adjusting a data storage capacity of said volatile memory cache to coincide with a measured energy level of said exhaustible energy storage unit.

31. A data storage system as described in claim 30 wherein said non-volatile storage medium comprises a redundant array of individual hard drives.

32. A data storage system as described in claim 30 wherein said exhaustible energy storage unit comprises a rechargeable battery.

33. A data storage system as described in claim 30 wherein said exhaustible energy storage unit comprises a replaceable battery.

34. A data storage system as described in claim 30 wherein logic adjusts said storage capacity by lowering said storage capacity in response to a decrease in said measured energy level, wherein said lowering said storage capacity is proportional to said decrease in said measured energy level.

35. A data storage system as described in claim 30 wherein logic adjusts said storage capacity by increasing said storage capacity in response to an increase in said measured energy level, wherein said increasing said storage capacity is proportional to said increase in said measured energy level.

* * * * *